United States Patent
Jacob et al.

(10) Patent No.: US 7,707,881 B2
(45) Date of Patent: May 4, 2010

(54) FILL LEVEL SENSOR OR PRESSURE SENSOR WITH AN ANTI-ADHESIVE COATING

(75) Inventors: Joern Jacob, Kirnbach (DE); Joergen Motzer, Gengenbach (DE); Thomas Deck, Wolfach (DE); Josef Fehrenbach, Haslach (DE)

(73) Assignee: Vega Grieshaber KG, Wolfach (DE)

( * ) Notice: Subject to any disclaimer, the term of this patent is extended or adjusted under 35 U.S.C. 154(b) by 205 days.

(21) Appl. No.: 11/454,827

(22) Filed: Jun. 16, 2006

(65) Prior Publication Data

US 2006/0288774 A1 Dec. 28, 2006

Related U.S. Application Data

(60) Provisional application No. 60/692,089, filed on Jun. 20, 2005.

(30) Foreign Application Priority Data

Jun. 20, 2005 (DE) .................. 10 2005 028 395

(51) Int. Cl.
*G01F 23/00* (2006.01)
*G01L 7/00* (2006.01)

(52) U.S. Cl. ...................... 73/290 R; 73/700

(58) Field of Classification Search ............... 73/290 R, 73/700
See application file for complete search history.

(56) References Cited

U.S. PATENT DOCUMENTS

| | | | |
|---|---|---|---|
| 5,037,701 A * | 8/1991 | Carre et al. | 428/420 |
| 6,435,025 B1 | 8/2002 | Krause | |
| 6,578,427 B1 | 6/2003 | Hegner | |
| 6,904,821 B2 | 6/2005 | Lenk | |
| 2002/0064649 A1 | 5/2002 | Lembke et al. | |
| 2004/0229444 A1 * | 11/2004 | Couillard et al. | 438/455 |
| 2005/0119105 A1 * | 6/2005 | Zimmer et al. | 501/32 |
| 2006/0216476 A1 * | 9/2006 | Ganti et al. | 428/143 |

FOREIGN PATENT DOCUMENTS

| | | |
|---|---|---|
| DE | 200 23 063 | 8/2003 |
| DE | 103 01 863 | 8/2004 |
| WO | WO 02/14804 A1 | 2/2002 |
| WO | 04/001359 | 12/2003 |

* cited by examiner

*Primary Examiner*—John Fitzgerald
(74) *Attorney, Agent, or Firm*—Fay, Kaplun & Marcin, LLP

(57) ABSTRACT

Described is a component for a fill level measuring device or for a pressure measuring device. The component may include a coating with a microsmooth surface so that the microsmooth surface remains essentially free of any deposits.

20 Claims, 3 Drawing Sheets

FILL LEVEL SENSOR OR PRESSURE SENSOR WITH AN ANTI-ADHESIVE COATING

PRIORITY CLAIM

This application claims the benefit of the filing date of U.S. Provisional Patent Application No. 60/692,089 filed Jun. 20, 2005, and of German Patent Application No. 10 2005 028 395.5 filed Jun. 20, 2005, the disclosure of which are hereby incorporated herein by reference.

TECHNICAL FIELD

The present invention relates to a component, a device for fill level measuring or pressure measuring, a method for coating the component, and the use of a component in a fill level measuring device or in a pressure measuring device.

BACKGROUND TO THE INVENTION

In many industrial fields, components are frequently subjected to considerable dirt accumulation and impurities that remain adhering to the surfaces of said components. However, partly due to the fact that these components are hard to reach or are used in hazardous environments, it is difficult or arduous to manually clean these components. Attempts have therefore been made to create surfaces that can feature self-cleaning effects.

In particular in the field of metrology, in which the devices used are exposed to harsh industrial conditions and are thus often covered with dirt, such dirt can significantly reduce the measuring characteristics. The term "dirt" can refer both to solid materials (such as e.g. dust) and to liquid materials, such as for example condensates. Depending on the conditions, considerable dirt accumulation can occur on the measuring device over time so that the measuring functions can be impeded or even cease altogether.

U.S. Pat. No. 6,435,025 B1 and WO 02/14804 A1 propose coatings which are based on the so-called lotus effect. In this technique the surface comprises a defined microstructure with elevations and indentations with structural dimensions ranging from 5 µm to 200 µm. The microstructure and its low-energy or hydrophobic character causes water to run off from the surface. At the same time any dirt particles located on the surface are swept away by the water that runs off.

Coatings of low-energy plastics such as for example PTFE or PVDF are a further option. As a rule such coatings are at least 1 mm thick so as to provide adequate sealing characteristics. These coatings are not transparent; as a result of their thickness they can also considerably influence the measuring characteristics of a measuring device.

SUMMARY OF THE INVENTION

There may be a need to provide a surface that can have a dirt repelling effect.

This need may be met by a component, by a production method, by a fill level device and pressure measuring device and by the use of the component in a fill level measuring device or in a pressure measuring device with the characteristics according to the independent claims.

According to an exemplary embodiment of the invention a component for a fill level measuring device or a pressure measuring device is created, wherein the component comprises a coating with a microsmooth surface so that the microsmooth surface remains essentially free of any deposits.

According to a further exemplary embodiment of the invention a method for producing a component for a fill level measuring device or for a pressure measuring device is created, wherein according to the method such a coating with a microsmooth surface is formed on the component that the microsmooth surface remains essentially free of deposits. In particular, a microsmooth surface may be formed wherein the microsmooth surface may be adapted in such a way that the microsmooth surface remains essentially free of deposits in particular when the surface is exposed to the environment.

According to a further exemplary embodiment of the invention, a device for measuring the fill level or for measuring the pressure is created, which device comprises a component with the characteristics described above.

According to a further exemplary embodiment of the invention a component with the characteristics described above is used in a fill level measuring device, a radar fill level measuring device or in a pressure measuring device.

Within the scope of this application the term "microsmooth" refers in particular to a characteristic of a surface which on average does not comprise any surface roughness whose structural dimensions exceed the micrometer range. In particular, according to this definition, surface structures of a "microsmooth" surface may at most comprise average dimensions below one micrometer. "Microsmooth" surfaces can have such minute surface roughness that surface impurities may at best become visible under a microscope with a resolution that is at least in the micrometer range. Furthermore, within the scope of this application, the term "microsmooth" may in particular refer to a characteristic of a surface which has a surface roughness of less than or equal to $Ra=1.2$ µm, preferably less than or equal to $Ra=0.8$ µm, or further preferably less than $Ra=0.6$ µm, or further preferably less than $Ra=0.1$ µm. Any further increase in the smoothness of a microsmooth surface may result in a "nanosmooth" surface, which according to the invention can be used instead of a microsmooth surface.

One idea of the invention may consist of improving or refining the surface quality so as to achieve anti-adhesive characteristics. To this extent the approach of the present invention may exactly the opposite to the approach taken in U.S. Pat. No. 6,435,025 B1 and WO 02/14804 A1, because according to the present invention no attempt at a defined formation of microstructures is made, but instead the aim is to achieve a surface that is as smooth as possible.

A microsmooth surface may not only repel water but, in contrast to the coatings according to U.S. Pat. No. 6,435,025 B1 and WO 02/14804 A1, it may repel dirt even in the absence of water, because the microsmooth coating may at least reduces the danger of dirt becoming trapped in surface structures instead of being repelled.

In order to achieve the goal of a non-wettable and self-cleaning surface, various surface characteristics are advantageous. Above all the contact angle of a medium on a surface may one of the most important characteristics that such a dirt-repelling surface should comprise. The contact angle indicates in particular the angle which a droplet of liquid forms on the surface of solid matter in relation to this surface. The larger the contact angle of a liquid, or of a droplet of liquid, in relation to a surface, the less bearing surface the droplet of liquid may have on the surface. The smaller the bearing surface, or the larger the contact angle, the greater the ease may be with which a droplet of liquid pearls off the surface.

It may be assumed that the size of the contact angle between a liquid and the surface depends in particular on the molecular interaction between these two. The smaller this interaction, the larger the contact angle may be.

Since the surface energy of a material is specific, a suitable selection of surface materials may create a surface that has as little energy as possible so as in this way to possibly increase the contact angle and thus the non-wettability and self-cleaning effect of a component. In order to achieve non-wettability and self-cleaning ability, the contact angle may be in particular at least 80°, between 80° and 160°, or preferably between 90° and 120°.

In contrast to the lotus effect, in which the bearing surface of droplets of liquid is reduced by a microstructure, the present invention may provide a significant advantage in that an extremely smooth surface is created, i.e. with a roughness of, for example, less than Ra=1.2 μm, preferably less than Ra=0.8 μm, or further preferably less than Ra=0.6 μm, or further preferably less than Ra=0.1 μm, so as in this way to possibly create mechanically stable coatings with good abrasion resistance. Since in the case of the lotus effect the surface may be extremely rough as a result of elevations and indentations in the structure, these microstructures may be mechanically very sensitive. Even when subjected to slight mechanical load the minute structure may be destroyed and the function of the lotus effect may be rendered ineffective. Furthermore, without the presence of water, preferably solid matter such as dust may more easily lodge in the roughly structured surface.

With the smooth surface of the present invention this may not be possible, or may possible only to a lesser extent. By creating an extremely smooth surface it may also possible to produce completely transparent coatings, which as a result of the roughness involved may also not be possible, or may possible only with extreme difficulties in the case of the lotus effect, because the microstructures may cause light refraction.

Applying the smooth coating according to the invention may also be advantageous when compared to applying plastic coatings, because these plastic coatings may also be soft and provide little abrasion resistance.

With the present invention it may become possible to render the surface, for example, of measuring devices, and in particular of those parts of the measuring device that are in contact with medium, permanently anti-adhesive without negatively influencing other characteristics of the measuring device. Because of the transparent coating, the coating according to the invention may not have any negative effect on the design of end products for the consumer. Furthermore, the excellent mechanical loadability of the coating may be advantageous.

Moreover, the production method involved for coating with the lotus effect may be extremely expensive, in particular in the case of non-planar structures, because the microstructure to be applied may be very difficult to produce. Since the method of producing microsmooth surfaces according to the present invention may be implemented much more easily and effectively, the production costs may be drastically reduced.

The quality or topology of technical surfaces may be characterised in particular using the terms "waviness" (to designate major deviations) and "roughness" (to designate smaller irregularities). The average peak-to-valley height Ra is mentioned in DIN 4768; it can be defined in particular as follows: the average peak-to-valley height Ra is the arithmetic mean value of all distances of the profile from the centre line. In the coating according to the invention Ra can be less than or equal to 1.2 μm, preferably less than or equal to 1 μm, further preferably less than or equal to 0.8 μm, or further preferably less than or equal to 0.1 μm.

Since the coating according to the invention can be made from inorganic materials, applications involving up 600° C. and beyond may be possible.

According to a further exemplary embodiment of the component the surface of the component comprises a coating made from a gradient material. The term "gradient material" refers in particular to a material which is characterised by two or more materials concentrations with different chemical and mechanical properties. For example, these coatings may be located in a planar manner, one beside the other, in a matrix design, or at random. The use of gradient materials on the surface of a component may make it possible, for example, to create an adhesive layer, which is adjacent to the component, which adhesive layer may have good abrasion resistance and at the same time may have a low-energy surface with good anti-adhesive properties.

In a further embodiment of the present invention the coating comprises a self-organised surface coating. Self-organised surface coatings may be characterised in that they can be applied as a uniform mixture and in that they align themselves in a defined way. This means that the coating may be applied as a whole, and that thus, for example, variously defined layers or various concentrations of a material in defined regions may form automatically.

According to a further embodiment of the present invention a section of the coating, which section adjoins the component, comprises a glass-ceramic network. A glass-ceramic network may have the characteristic, among others as a result of its polarity, of adhering to the surface of a component in the manner of a firm chemical bond so that good mechanical stability or good abrasion resistance may be achieved. The glass-ceramic network may comprise silicon oxide networks or polar silicon oxide networks.

In a further embodiment nanoparticles can be embedded in these glass-ceramic networks, which nanoparticles significantly improve the mechanical stability and abrasion resistance.

In a further exemplary embodiment of the present invention the coating comprises a material with a low-energy surface. As already mentioned, the largest possible contact angle between liquids or dirt build-up and the surface may be required in order to achieve non-wettability and to create a dirt-repelling effect on surfaces. A spherical shape may be the ideal form of droplets of liquid on the surface. In this case the contact angle would be 180°. In order to achieve this the surface may have to be designed in an extremely low-energy manner so as to minimise interaction between the liquid, or the soil build-up, and the surface. Only in this way may the desired approximate droplet shape and good removal of soil build-up occur. In this arrangement the surface tension of the material used may be less than 40 mN/m, preferably less than 30 mN/m, or further preferably less than 20 mN/m. For example, the surface may comprise fluorocarbon compounds with extremely low-energy characteristics.

In a further exemplary embodiment of the invention the surface has a large contact angle in relation to water. This may be advantageous in that water pearls off easily and the surface can thus be designed to be self-cleaning. The term "large" contact angle refers in particular to an angle in relation to water of at least 80°. This means that the contact angle in relation to water may be at least 80°, but it should range from 80° to 160°. Preferably a contact angle of 90°-120° in relation to water is formed. In the case of angles of approximately 90° the surfaces are hydrophobic, and in the case of even larger angles the surfaces are superhydrophobic.

The smooth surface according to the invention is different from the rough surface of the lotus effect, which surface is characterised by its microstructure. The Ra value may be used as a unit of measurement in order to define the term "smooth" or "microsmooth" as used in this application. According to the invention the term "smooth" may define in particular an Ra value of Ra≦1.2 μm.

In a further exemplary embodiment of the invention the roughness of the coating of the surface is less than Ra=0.1 μm.

Surface coatings according to the present invention may above all be used in the case of components that are subjected to very considerable dirt build-up. Above all the surface of measuring devices, in particular of parts of measuring devices that are in contact with media, should be designed so as to have permanent anti-adhesive characteristics. This may include components and devices for transmitting and/or receiving electromagnetic waves or of sound waves, adaptation cones, funnels, reflection surfaces, rod aerials, piezoelectronic sound generators, ropes and cables, rods, vibrating rods and vibrating forks, as well as devices for registering pressures.

In a further exemplary embodiment of the method, said method further comprises the step of applying a coating of a gradient material to the surface of the component.

In a further exemplary embodiment of the method, said method further comprises the step of forming a coating with a self-organising surface.

In a further exemplary embodiment of the method, said method comprises the step of forming a coating that in a section that adjoins the component comprises a glass-ceramic network.

In a further exemplary embodiment of the method, said method further comprises the step of embedding nanoparticles in the glass-ceramic network.

In a further exemplary production method of the present invention, said production method comprises the step of forming a coating that comprises a low-energy surface.

In a further exemplary embodiment of the production method, said production method further comprises the step of applying a coating which in the direction of the surroundings comprises a large contact angle in relation to water.

In a further exemplary embodiment of the production method, said production method further comprises the step of applying a coating to the surface of the component by a dipping method and/or spraying method. In this way the desired coating may simply be sprayed onto the components, or the components may be dipped into a bath containing a material for coating, so that subsequently, after optional drying out, a non-wettable and dirt-repelling surface coating may form. These two methods may provide an advantage in that the desired coating may easily and economically be applied even to angular positions.

If, for example, a coating of a gradient material for example with a self-organising character is selected there may be the additional option, after dipping or spraying of the components, of achieving a coating in which a differing concentration in various areas is formed. In this way it may, for example, be possible to form a coating of an especially low-energy character on the surface, whereas on the coating adjacent to the component a strongly adhesive and mechanically stable coating may be formed.

Advantageously the so-called sol-gel method may be applied. The sol-gel method, which may be used to create coatings on materials such as steel, brass, copper, aluminium, glass and plastics (e.g. PA, PMMA, PC, ABS), is known per se (see e.g. http://www.moeller-medical.com/de/nano.html). Furthermore, the sol-gel method for producing thin films is disclosed as such in Georgi, U. et al. 1997, "Chemical Modification of Thin Silica Films via the Sol-Gel-Process", J. Sol-Gel-Sci. Technol. 8:507-509.

In a further exemplary embodiment of the method, said method comprises the step of producing a surface of the component whose roughness is less than Ra=0.1 μm.

In a further exemplary embodiment of the device, said device is a radar fill level measuring device.

BRIEF DESCRIPTION OF THE DRAWINGS

Below, for further explanation and to provide a better understanding of the present invention, exemplary embodiments are described in more detail with reference to the enclosed drawing. The following are shown.

DETAILED DESCRIPTION OF EXEMPLARY EMBODIMENTS

Figure 1:
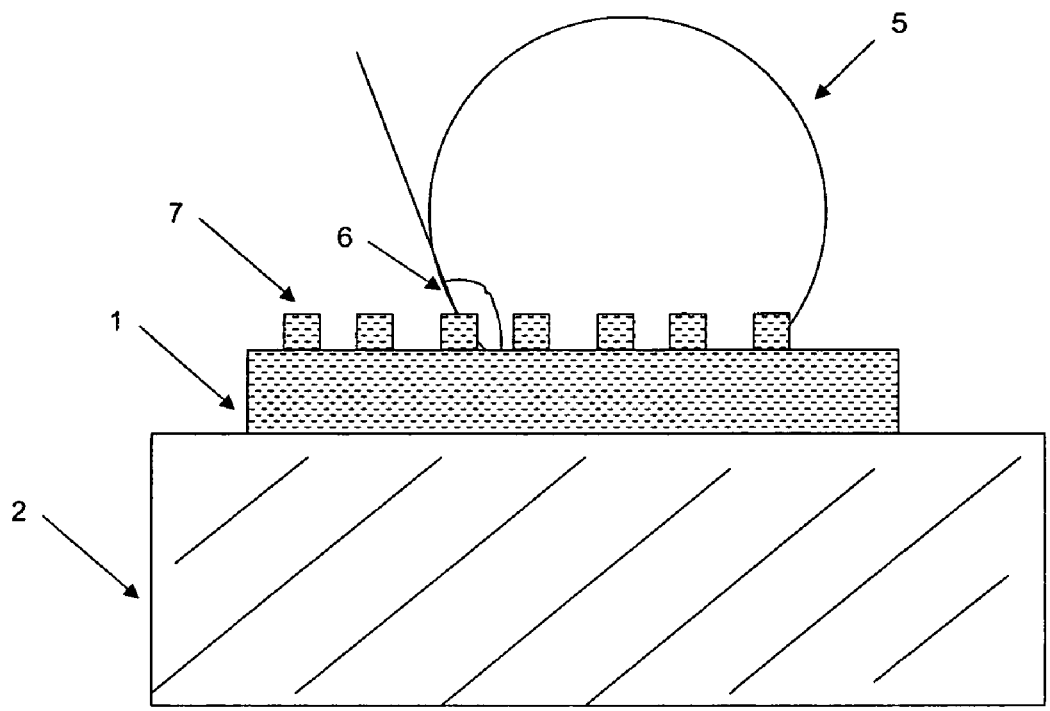
FIG. 1 a diagrammatic view of a surface coating by the lotus effect.

Identical or similar components in different figures have the same reference characters.

The illustrations in the figures are diagrammatic and not to scale.

Figure 2:
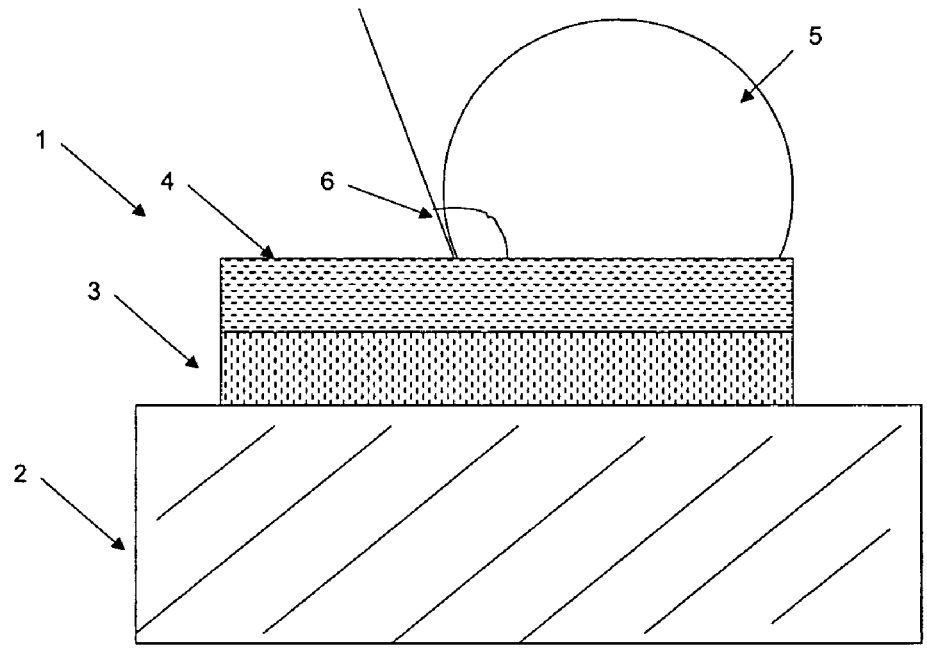
FIG. 2 a diagrammatic view of a surface coating, in which two different coatings are formed, according to an embodiment of the invention.

FIG. 2 shows an embodiment according to the invention. A component, for example a component for a fill level measuring device or for a pressure measuring device, is shown with a coating 1 on which there is a droplet 5 of liquid or some dirt 5. Because the surface of the coating 4 is microsmooth the deposit 5 can run down the surface.

FIG. 1. shows a component 2 that comprises a coating 1 which with the use of the lotus effect has anti-adhesive properties. In this arrangement the coating 1 has been applied to a component 2. At its surface there is a microstructure 7 that comprises elevations and indentations. These elevations and indentations are 5-200 μm in height and spaced 5-50 μm apart from each other. The droplet 5 of liquid rests on the surface that consist of or comprises the microstructure 7 so that as a result of the small contact area of the droplet 5 of liquid, said droplet can easily pearl off. The contact angle is 110°, as for example shown in FIG. 1.

If this microstructure 7 is destroyed by mechanical or chemical action, the coating 1 with the lotus effect loses its effect. FIG. 1 shows a further disadvantage, namely that as a result of the microstructure 7 an extremely rough surface arises in which small dirt particles lodge that can only be washed away with a lot of liquid.

FIG. 2 shows a component 2 according to the invention with a coating 1. In this arrangement the coating 1 is divided into two regions 3, 4 of different materials concentration. On the side 3 facing the component 2 a coating is formed that is extremely firmly interconnected with the component 2 so as to achieve good abrasion resistance and/or a mechanically stable coating. On the surface of the coating 1 a coating 4 with anti-adhesive properties is formed. This means that said coating is a permanent low-energy surface, i.e. it interacts little with water, as a result of which the contact angle 6 is large, for example in FIG. 2 it is 110°, and the pearling-off of liquids is facilitated.

For explanation, FIG. 2 also shows a droplet 5 of liquid, on which the contact angle 6 is diagrammatically shown. It becomes clear that the contact angle 6 becomes larger the more the liquid 5 forms a sphere, and that the contact surface between the droplet 5 and the coating 1 or 4 is reduced, and consequently soiling 5 can easily pearl off.

For the liquid 5 to approximate a spherical shape the interaction between the coating 1 and the liquid 5 must be minimal so that a low-energy surface has to be created.

Figure 3:
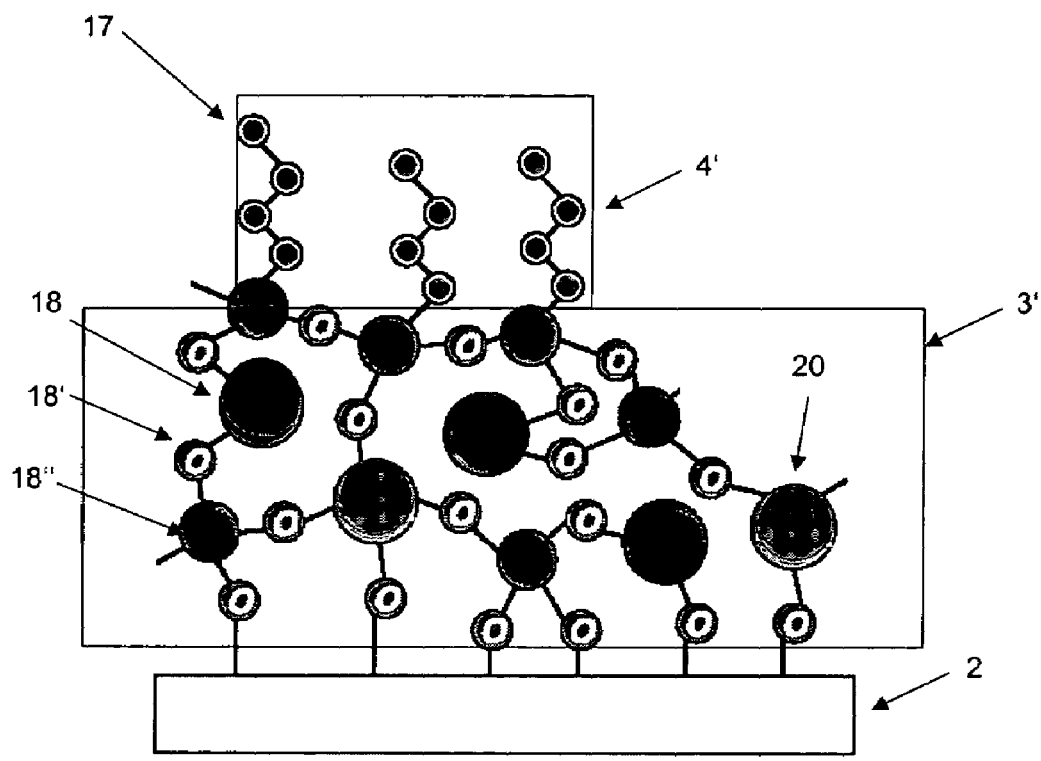
FIG. 3 a diagrammatic view of a surface coating according to an embodiment of the invention.

FIG. 3 shows an exemplary embodiment of the present invention. In a detailed view the various molecular structures are shown. On the side 3' facing the workpiece, molecular compounds can form which firmly connect the coating 3 to the component 2, or materials are used that generate very strong mutual interaction. FIG. 3 shows a glass-ceramic polar Si—O network 18, 18', 18" as a side 3' facing the component 2, in which network nanoparticles such as for example $MeO_2$ 20 are embedded. A chemically firm bond with the component 2 is created.

According to FIG. 3, on the surface of the coating 1 a layer 4 comprising or consisting of fluorocarbon 17 is formed. This is an extremely low-energy coating that is microsmooth or it has a low Ra value.

It should be pointed out that the exemplary coatings that may form or comprise several concentration regions of various materials, e.g. due to their self-organising character, are not strictly divided into two parts but instead they can be defined concentration shifts within a coating 1.

Figure 4:
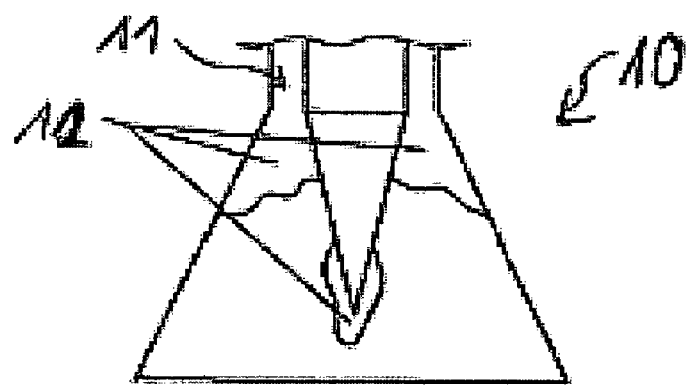
FIG. 4 a horn aerial of a radar fill level measuring device with a conventional surface.

Furthermore, with reference to FIG. 4, a horn aerial 10 of a radar fill level measuring device without a coating according to the invention is described.

In its installed state the horn aerial 10 of such a fill level sensor protrudes into the interior space of a container (e.g. of a holding tank for liquids). A radar measuring pulse radiated from the horn aerial 10 is reflected by the surface of the feed material in the container. The aerial 10 absorbs the reflected pulse. From the entire transit time of the pulse, the distance between the reflecting surface and the aerial 10 is determined, which distance corresponds to the fill level.

In the case of liquid feed materials any contact of the aerial 10 with feed material vapour results in surface deposits and eventually condensate formation, e.g. in crevices and other narrow hollow spaces within the aerial structure. Similarly, particular feed materials can reach the aerial 10, e.g. during filling of the container.

Figure 5:
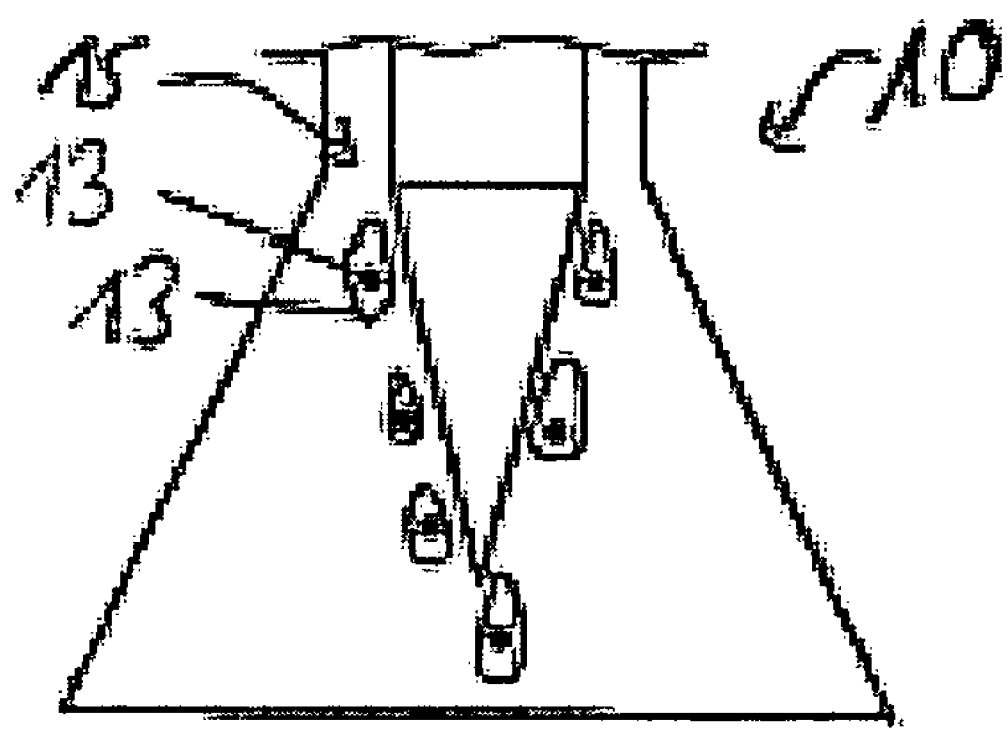
FIG. 5 a horn aerial of a radar fill level measuring device with a self-cleaning surface according to an embodiment of the invention.

While in conventional surfaces 11 such condensate 12 or such particles adhere to the aerial 11, causing corresponding distortions in the transmitted or received radar signal, as shown in FIG. 5 in the case of sensors according to the invention, which sensors feature a microsmooth surface 15, condensate fractions 13 easily run down the aerial 10; any dirt particles that adhere are taken up by condensate droplets 13 during operation of the device and are led away from the surface of said device. The resulting permanent self-cleaning action of the sensor prevents permanent adhesion of dirt to its surface, and in this way ensures even, distortion-free measuring accuracy and functional reliability.

Since sensors of the type mentioned are often also used in outdoor equipment that is exposed to the usual climatic conditions, according to the invention it is preferred to design with a microsmooth surface even those parts or components of sensors that are not directly in contact with the medium to be measured. Thus it is sensible, and preferred according to the invention, to design with a self-cleaning surface in particular also housing components and measured values or parameter displays that are exposed to climatic conditions. Accordingly, the corresponding housing or measured value display components of sensors according to the invention are regularly freed of any adhering dirt or dust by the action of rain, as a result of which both a clean external appearance and easy readability of displays is maintained permanently even without any particular cleaning effort.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

The invention claimed is:

1. A component for one of (i) a fill level measuring device and (ii) a pressure measuring device, comprising:
a coating with a microsmooth surface so that the microsmooth surface remains essentially free of any deposits,
wherein a surface region of the coating comprises a material with a low surface tension and
wherein a section of the coating, which section adjoins the component, comprises a glass-ceramic network and wherein nanoparticles are embedded in the glass-ceramic network.

2. The component according to claim 1, wherein the coating is made from a gradient material.

3. The component according to claim 1, wherein the coating comprises a surface coating that has been formed by self organisation.

4. The component according to claim 1, wherein the glass-ceramic network comprises a silicon oxide compound.

5. The component according to claim 1, wherein the microsmooth surface of the coating has a roughness of less than Ra=1 μm, in particular less than Ra=0.1 μm.

6. The use of a component according to claim 1 in a fill level measuring device or in a pressure measuring device.

7. The component according to claim 1, designed as a component from a group consisting of a device for transmitting and/or receiving electromagnetic waves or sound waves, an adaptation cone, a funnel, a reflection surface, a rod aerial, a piezoelectronic sound generator, a rope, a cable, a rod, a vibrating rod, a vibrating fork, a sensor and a device for registering pressures.

8. The component according to claim 1, wherein the low surface tension is less than 40 mN/m.

9. The component according to claim 8, wherein the material with low surface energy comprises fluorocarbon compounds.

10. The component according to claim 8, wherein the surface region has a large contact angle in relation to water.

11. The component according to claim 10, wherein the surface region has a contact angle in relation to water of at least 80°, in particular between 90° and 120°.

12. A method for producing a component for a fill level measuring device or for a pressure measuring device, comprising:
forming a coating with a microsmooth surface on the component so that the microsmooth surface remains essentially free of any deposits;
forming the coating with a low-energy surface;
forming the coating that in a section that adjoins the component comprises a glass-ceramic network; and
embedding nanoparticles in the glass-ceramic network.

13. The production method according to claim 12, further comprising the step of:
   applying the coating of a gradient material to the surface of the component.

14. The production method according to claim 12, further comprising the step of:
   forming the coating with a self organising surface.

15. The production method according to claim 12, further comprising the step of:
   applying the coating which in the direction of the surroundings comprises a large contact angle in relation to water.

16. The production method according to claim 12, further comprising the step of:
   applying the coating to the surface of the component by dipping method and/or by a spraying method.

17. The production method according to claim 12, further comprising the step of:
   applying the coating by a sol-gel method.

18. The production method according to claim 12, further comprising the step of:
   producing the surface of the component with a roughness of less than Ra=1 μm, in particular less than Ra=0.1 μm.

19. A device for fill level measurement or pressure measurement, comprising:
   at least one component according to claim 1.

20. The device according to claim 19, equipped as a radar fill level measuring device.

* * * * *